US 6,578,904 B1

(12) United States Patent
Yvetot et al.

(10) Patent No.: US 6,578,904 B1
(45) Date of Patent: Jun. 17, 2003

(54) VEHICLE, IN PARTICULAR PASSENGER VEHICLE, WITH IMPACT ABSORBING STRUCTURE AVOIDING OVERLAP

(75) Inventors: Marc Yvetot, Paris (FR); Emmanuel Boudard, Voisins le Bretonneux (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 10/129,278

(22) PCT Filed: Oct. 27, 2000

(86) PCT No.: PCT/FR00/03002

§ 371 (c)(1),
(2), (4) Date: May 3, 2002

(87) PCT Pub. No.: WO01/34451

PCT Pub. Date: May 17, 2001

(30) Foreign Application Priority Data

Nov. 8, 1999 (FR) .............................. 99 13996

(51) Int. Cl.[7] .................................................. B60J 7/00
(52) U.S. Cl. .................. 296/189; 296/188; 296/203.02; 296/194; 293/155; 293/146; 293/133
(58) Field of Search ................................ 296/189, 194, 296/204, 203.02, 203.01; 280/784; 293/133, 146, 155

(56) References Cited

U.S. PATENT DOCUMENTS

| 3,709,542 | A | * | 1/1973 | Fehlau et al. ............... 293/155 |
| 3,883,166 | A | * | 5/1975 | Cadiou ........................ 296/189 |
| 3,923,330 | A | * | 12/1975 | Viall et al. ................... 293/146 |
| 4,168,855 | A | * | 9/1979 | Koch ........................... 293/155 |
| 4,217,970 | A | * | 8/1980 | Chika .......................... 296/188 |
| 4,428,599 | A | * | 1/1984 | Jahnle ......................... 296/189 |
| 4,466,653 | A | * | 8/1984 | Harasaki ..................... 296/189 |
| 4,940,281 | A | * | 7/1990 | Komatsu ..................... 296/194 |
| 5,031,947 | A | * | 7/1991 | Chen ........................... 293/146 |
| 5,358,304 | A | * | 10/1994 | Kanemitsu et al. .......... 296/194 |
| 5,720,511 | A | * | 2/1998 | Benedyk ................. 296/203.01 |
| 5,853,195 | A | * | 12/1998 | Le et al. ...................... 296/189 |
| 6,176,529 | B1 | * | 1/2001 | Kitzmiller et al. ........... 293/146 |
| 6,203,078 | B1 | * | 3/2001 | Karrer ......................... 293/146 |
| 6,382,709 | B1 | * | 5/2002 | Chirifu et al. ............... 296/189 |
| 6,428,065 | B2 | * | 8/2002 | Sato et al. .................... 293/133 |
| 6,435,577 | B1 | * | 8/2002 | Renault ....................... 296/189 |
| 2002/0158476 | A1 | * | 10/2002 | Stol et al. .................... 293/133 |
| 2002/0190542 | A1 | * | 12/2002 | Takeuchi et al. ............ 296/194 |
| 2003/0025358 | A1 | * | 2/2003 | Taguchi et al. ......... 296/203.02 |
| 2003/0025359 | A1 | * | 2/2003 | Takahashi et al. ...... 296/203.02 |

FOREIGN PATENT DOCUMENTS

| DE | 42 30 669 | 3/1994 |
| EP | 0 926 048 | 6/1999 |

* cited by examiner

Primary Examiner—Kiran Patel
(74) Attorney, Agent, or Firm—Oblon, Spivak, McClelland, Maier & Neustadt, P.C.

(57) ABSTRACT

A motor vehicle structure including at least two upper side-members arranged at the level of the bumper, at least two lower side-members connected to the upper side-members by two linking supports, and a cross-member linking the two lower side-members at their front end. The front ends of the lower side-members are substantially in line with the front ends of the upper side-members and the two linking supports are arranged substantially between the front ends of the upper and lower side-members. The rear end of the lower side-members is designed to be supported on a stop portion of a structural element in a case of a head-on impact.

12 Claims, 2 Drawing Sheets

FIG_1

VEHICLE, IN PARTICULAR PASSENGER VEHICLE, WITH IMPACT ABSORBING STRUCTURE AVOIDING OVERLAP

BACKGROUND OF THE INVENTION

1. Field of the Invention

The present invention relates to a motor vehicle, particularly a passenger vehicle. Such a vehicle comprises a passenger compartment, a bumper positioned forward thereof in the direction of travel of the vehicle, and at least one supporting and impact-resisting structure disposed between the bumper and the passenger compartment, the structure extending basically in the longitudinal direction of the vehicle and being provided with two side members disposed at the height of the bumper, supporting it at their front end, and extending basically in the longitudinal direction of the vehicle toward the passenger compartment.

2. Discussion of the Background

Numerous proposals already have been made to improve safety in the event of frontal impacts between a vehicle and a fixed or movable obstacle, especially in the event of impacts between two vehicles. All proposals are aimed at absorbing the kinetic energy of the impact in more or less controlled and localized manner, at the front of the vehicle, in order to prevent irreparable harm to the passengers.

According to British Patent 1532408, kinetic-energy-absorbing devices such as hydraulic or pneumatic cylinders are interposed between the bumper and the side members. According to other proposals, diverse types of metal profiled sections are used, especially in the form of solid or hollow beams, intended to absorb the kinetic energy of the impact better and to have predictable behavior.

French Patent 2439124 describes a motor vehicle, particularly a passenger vehicle, provided with a passenger compartment, a bumper positioned forward thereof in the direction of travel of the vehicle, and at least one supporting and impact-resisting structure disposed between the bumper and the passenger compartment, the structure extending basically in the longitudinal direction of the vehicle and being provided with two upper side members disposed at the height of the bumper, supporting it at their front end, and extending basically in the longitudinal direction of the vehicle toward the passenger compartment, two lower side members disposed parallel to and underneath the upper side members and joined to the upper side members by two binding supports, a crossbeam connecting the two lower side members at their front end; the lower side members are disposed at the level of the floor of the passenger compartment and are joined thereto at their rear end; their front end is well back of the front ends of the upper side members, and is connected thereto by two sloping binding supports. In the event of an impact, it is substantially the upper side members that become deformed, the sloping binding supports being bent vertically upward during the impact; as a result, it is possible that the lower side members may undergo a certain deformation.

These known devices certainly contribute to attenuating the violence of impacts by channeling and absorbing the kinetic energy, but they do not prevent other adverse phenomena from occurring, particularly the wedging of one vehicle into the other in the case of frontal impact, with penetration of an upper side member of one vehicle into the vehicle traveling in the opposite direction. This is a major risk in particular in "left side" frontal collisions (for left-hand drives), with only 50% overlap of the vehicles. In fact, the structure disclosed by French Patent 2439124 would even have a tendency to aggravate the situation, since the upper side members are positioned in the manner of rams.

SUMMARY OF THE INVENTION

The object of the invention is to remedy this problem and to propose a vehicle comprising an impact-resisting and impact-absorbing structure, capable of limiting the risks of wedging or penetration in the event of frontal impact between two vehicles.

The invention achieves its object by virtue of a motor vehicle, particularly a passenger vehicle, provided with a passenger compartment, a bumper positioned forward thereof in the direction of travel of the vehicle, and at least one supporting and impact-resisting structure disposed between the bumper and the passenger compartment, the structure extending basically in the longitudinal direction of the vehicle and being provided with at least two upper side members disposed at the height of the bumper, supporting it at their front end, and extending basically in the longitudinal direction of the vehicle toward the passenger compartment, at least two lower side members disposed parallel to and underneath the upper side members and joined to the upper side members by two binding supports, a crossbeam connecting the two lower side members at their front end, characterized in that the front ends of the lower side members are substantially vertically aligned with the front ends of the upper side members and the binding supports are disposed substantially between the front ends of the upper and lower side members. Very advantageously, the rear end of the lower side members is disposed in such a way that it will be braced against a stop portion of the vehicle structure in the event of frontal impact.

Thus the crossbeam and the binding supports form a U-shaped frame suspended in vertical alignment with the front ends of the upper side members. This structure makes it possible, in the event of a frontal impact between two vehicles, to prevent the upper side members of one vehicle from passing above those of the vehicle traveling in the opposite direction, by virtue of the fact that the low path for transmission of forces, constituted by the U-shaped frame, can "intercept" structural elements of the other vehicle, the motive power unit or the wheel. In other words, the U-shaped frame prevents the side members from rising upward during the impact.

It will be noted that, in the art of trucks, there is known from European Patent 0696535, for example, a structure in which a crossbeam provided at the front of the side members forms with the bumper a frame at the front of the vehicle, but this structure is provided substantially for mounting trailer-coupling means and does not play any part in the matter of absorbing the kinetic energy of the impact, and furthermore, it is not provided with lower side members.

Advantageously, the lower side members are entirely suspended on the upper side members, their rear ends being disposed at a distance from a stop portion of the vehicle structure, with which they make contact only in the event of an impact.

The lower side members are suspended from the upper side members not only by the binding supports but also by at least one tie rod.

Advantageously, the lower side member on the engine side is suspended by a single tie rod and the lower side member on the gearbox side is suspended by two tie rods.

The lower side members are constructed in such a way, for example in the form of hollow bodies, that they can absorb the kinetic energy of the impact. Preferably they comprise two longitudinal sections of different compressibility.

Advantageously, a restraining device without permanent contact is provided at the rear end of the lower side members to prevent them from becoming axially misaligned with the stop portion of the passenger compartment.

BRIEF DESCRIPTION OF THE DRAWINGS

The invention will be better understood by means of the following description, with reference to the attached drawings wherein.

DESCRIPTION OF THE PREFERRED EMBODIMENTS

Figure 1:
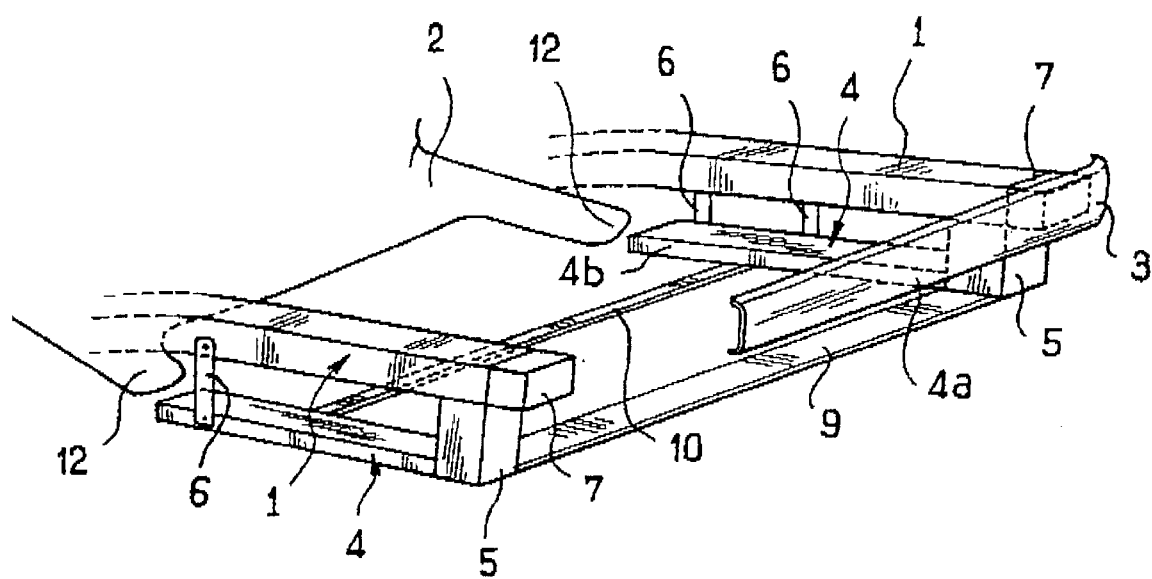
FIG. 1 is a simplified perspective view of the front three quarters of the main elements of the resisting structure of the invention.
Figure 2:
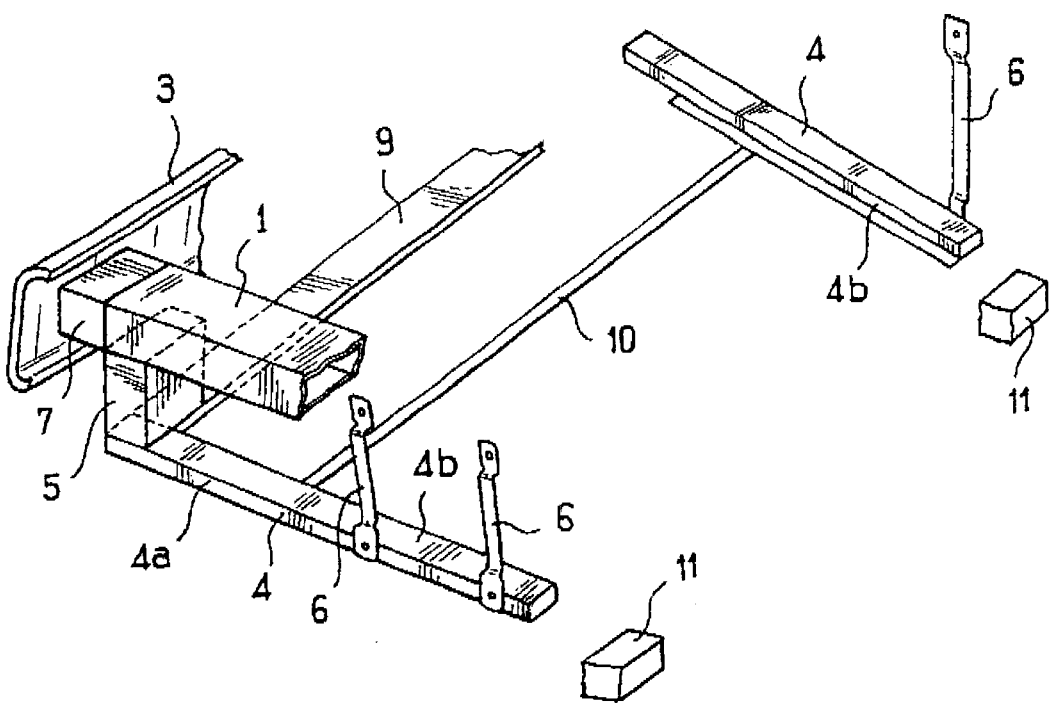
FIG. 2 is an exploded perspective and partly cutaway view of the rear three quarters of the same structure.
Figure 3:
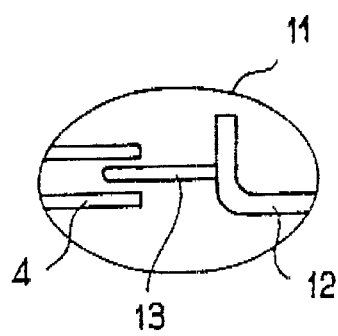
FIG. 3 illustrates a detail of the restraining device provided at the rear of the lower side members.

FIGS. 1 and 2 show upper side members 1, which are constructed in the form of hollow bodies, for example, braced at their rear end directly or indirectly on a structural element of the vehicle (in this case, for example, on engine mount 2) and carrying bumper 3 at their front end. Upper side members 1 support lower or secondary side members 4 by a suspension arrangement comprising on the one hand binding supports or uprights 5 and on the other hand one or more tie rods 6. Between bumper 3 and the end of upper side member 1 there is fixed a removable absorbing element 7, whose function is to dissipate the kinetic energy of impacts at low speed, up to about 15 km/h, so that thereafter the vehicle can be repaired at the lowest possible cost. A crossbeam 9 is disposed between the two uprights 5. Uprights 5 are disposed substantially at the front ends of secondary side members 4 and of upper side members 1. Such an arrangement makes it possible to dissipate the kinetic energy above 15 km/h as soon as possible. The side member situated on the gearbox side, or in other words the left side member for a left-hand drive, is provided with two tie rods 6, one situated close to the rear and the other situated on an intermediate portion of secondary side member 4. On the engine side, the other upper side member is provided with only one tie rod 6, positioned at the rear of secondary side member 4. Secondary side members 4 are advantageously constructed in the form of hollow bodies that permit energy absorption by compression, preferably in two sections 4a, 4b of different compressibility: section 4a situated at the front of the secondary side member is deformable, while rear section 4b is scarcely compressible at all. A transverse tie rod 10 can connect the two secondary side members 4 between the sections of different compressibility. As an example, the fixations of transverse tie rod 10 to secondary side members 4 are located substantially in the middle portion of zone 4a of the said secondary side members. At the rear of secondary side members 4, restraining devices 11 are interposed between secondary side members 4 and stop portion 12 of the engine mount, from which they are spaced apart by a gap that is eliminated during an impact. The principle of restraining device 11 is illustrated in FIG. 3, which shows a finger 13 joined to stop portion 12 and penetrating without contact (under normal conditions) into a hollow recess at the end of secondary side member 4, with sufficient clearance to allow for tolerances and ranges of movement while accommodating assembly gaps. The fact that the secondary side members are not integral with the engine mount prevents transmission of vibrations. Finger 13 ensures that secondary side member 4 cannot escape while it is undergoing compression during an impact. If necessary, finger 13 can be coated with an elastic material.

What is claimed is:

1. A motor vehicle, provided with a passenger compartment, and a bumper positioned forward of the passenger compartment in a direction of travel of the vehicle, comprising:

at least one supporting and impact-resisting structure disposed between the bumper and the passenger compartment, the structure extending substantially in a longitudinal direction of the vehicle and including:

at least two upper side members disposed at a height of the bumper, supporting the bumper at their front end, and extending substantially in the longitudinal direction of the vehicle toward the passenger compartment;

at least two lower side members disposed parallel to and underneath the upper side members and joined to the upper side members by two binding supports;

a crossbeam connecting the two lower side members at their front end, wherein the front ends of the lower side members are substantially vertically aligned with the front ends of the upper side members; and wherein the two binding supports are disposed substantially between the front ends of the upper side members and lower side members.

2. A vehicle according to claim 1, wherein rear ends of the lower side members are disposed to be braced against a stop portion of a structural element in event of frontal impact.

3. A vehicle according to claim 1, wherein the lower side members are entirely suspended on the upper side members, rear ends of the lower side members being disposed at a distance from a stop portion of the passenger compartment.

4. A vehicle according to claim 3, wherein the lower side members are suspended from the upper side members not only by the binding supports but also by at least one tie rod.

5. A vehicle according to claim 4, wherein one of the lower side members is on an engine side and is suspended by a single tie rod of the at least one tie rod.

6. A vehicle according to claim 1, wherein the lower side members are suspended from the upper side member not only by the binding supports but also by at least two tie rods, and wherein one of the lower side members is on the gearbox side and is suspended by two of the tie rods.

7. A vehicle according to claim 1, wherein the lower side members are provided with two longitudinal sections of different compressibility.

8. A vehicle according to claim 1, wherein the lower side members are connected by a transverse tie rod.

9. A vehicle according to claim 7, wherein the lower side members are connected by a transverse tie rod.

10. A vehicle according to claim 8, wherein the transverse tie rod is fixed substantially in a middle portion of one of the two longitudinal sections of the lower side members.

11. A vehicle according to claim 1, further comprising a restraining device without permanent contact provided at a rear end of the lower side members to prevent the lower side members from becoming axially misaligned with a stop portion of the passenger compartment.

12. A vehicle according to claim 1, further comprising a removable absorbing element disposed between the bumper and an end of the upper side member.

* * * * *